US012784131B2

(12) United States Patent
Huang et al.

(10) Patent No.: US 12,784,131 B2
(45) Date of Patent: Nov. 3, 2026

(54) IMAGE PROCESSING IC AND IMAGE PROCESSING METHOD FOR ECONOMICAL PICTURE QUALITY PROCESSING BASED ON SYMMETRICAL SCALING

(71) Applicant: Novatek Microelectronics Corp., Hsinchu (TW)

(72) Inventors: Chi-Ying Huang, Tainan City (TW); Hung-Ming Wang, Tainan City (TW)

(73) Assignee: Novatek Microelectronics Corp., Hsinchu (TW)

( * ) Notice: Subject to any disclaimer, the term of this patent is extended or adjusted under 35 U.S.C. 154(b) by 293 days.

(21) Appl. No.: 18/648,468

(22) Filed: Apr. 28, 2024

(65) Prior Publication Data

US 2025/0336028 A1 Oct. 30, 2025

(51) Int. Cl.

*G06T 3/40* (2024.01)
*G06T 5/20* (2006.01)
*G06T 5/70* (2024.01)

(52) U.S. Cl.

CPC .................. *G06T 3/40* (2013.01); *G06T 5/20* (2013.01); *G06T 5/70* (2024.01)

(58) Field of Classification Search

CPC ........... G06T 3/40; G06T 5/70; H04N 7/0117; H04N 5/2628; H04N 21/440263

See application file for complete search history.

(56) References Cited

U.S. PATENT DOCUMENTS 11,544,816 B2 1/2023 Kim et al.
11,551,332 B2 1/2023 Kim et al.
12,211,175 B2 1/2025 Lee et al.
2011/0090991 A1 4/2011 Kim et al.
2021/0166304 A1 6/2021 Kim et al.
2021/0166345 A1 6/2021 Kim et al.
2021/0217203 A1* 7/2021 Kim ........................ G06T 9/001
2021/0398253 A1* 12/2021 Marrs ..................... G06T 11/40
2022/0038715 A1 2/2022 Wee et al.
2023/0153948 A1 5/2023 Lee et al.
2025/0227309 A1* 7/2025 Kang ..................... H04N 19/86

FOREIGN PATENT DOCUMENTS

CN 108846800 11/2018
CN 116744056 9/2023
TW 202335483 9/2023
WO WO-2020085781 A1 * 4/2020 ........... G06N 3/0464

* cited by examiner

*Primary Examiner* — Andrew M Moyer
*Assistant Examiner* — Conor A O'Malley
(74) *Attorney, Agent, or Firm* — JCIPRNET

(57) ABSTRACT

The image processing IC includes a down-scaler circuit, a picture quality processing circuit, and an up-scaler circuit. The down-scaler circuit converts a first image frame with a first resolution into a second image frame with a second resolution smaller than the first resolution by using a down-scaling operation. The picture quality processing circuit performs at least one picture quality processing on the second image frame to generate a third image frame. The up-scaler circuit converts the third image frame with a third resolution into a fourth image frame with a fourth resolution greater than the third resolution by using an up-scaling operation. The up-scaling operation performed by the up-scaler circuit is symmetrical to the down-scaling operation performed by the down-scaler circuit.

26 Claims, 7 Drawing Sheets

IMAGE PROCESSING IC AND IMAGE PROCESSING METHOD FOR ECONOMICAL PICTURE QUALITY PROCESSING BASED ON SYMMETRICAL SCALING

BACKGROUND

Technical Field

The disclosure relates to an electronic circuit, and in particular to an image processing integrated circuit and an image processing method.

Description of Related Art

In the display device, the image processing integrated circuit may perform image processing on the original image frame to generate a processed image frame for the display driver circuit. The resolution of the original image frame has a trend of getting higher and higher. Generally, the higher the resolution of the original image frame, the greater the processing cost and power consumption of the image processing. How to make the image processing integrated circuit perform the image processing more economically is one of the many issues in the field of image processing technology.

SUMMARY

The disclosure provides an image processing integrated circuit and an image processing method to perform picture quality processing economically.

In an embodiment of the disclosure, an image processing integrated circuit includes a down-scaler circuit, a picture quality processing circuit, and an up-scaler. The down-scaler circuit converts a first image frame with a first resolution into a second image frame with a second resolution smaller than the first resolution by using a down-scaling operation. The picture quality processing circuit is coupled to the down-scaler circuit to receive the second image frame. The picture quality processing circuit performs at least one picture quality processing on the second image frame to generate a third image frame. The up-scaler circuit is coupled to the picture quality processing circuit to receive the third image frame. The up-scaler circuit converts the third image frame with a third resolution into a fourth image frame with a fourth resolution greater than the third resolution by using an up-scaling operation. The up-scaling operation performed by the up-scaler circuit is symmetrical to the down-scaling operation performed by the down-scaler circuit.

In an embodiment of the disclosure, an image processing method includes: converting, by a down-scaler circuit, a first image frame with a first resolution into a second image frame with a second resolution smaller than the first resolution by using a down-scaling operation; performing, by a picture quality processing circuit, at least one picture quality processing on the second image frame to generate a third image frame; and converting, by an up-scaler circuit, the third image frame with a third resolution into a fourth image frame with a fourth resolution greater than the third resolution by using an up-scaling operation, where the up-scaling operation performed by the up-scaler circuit is symmetrical to the down-scaling operation performed by the down-scaler circuit.

Based on the above, the down-scaler circuit described in the embodiments of the disclosure converts the first image frame (the first resolution) into the second image frame (the second resolution smaller than the first resolution) by using the down-scaling operation. Afterwards, the picture quality processing circuit performs one or multiple picture quality processing on the second image frame to generate the third image frame. Because the resolution of the source (the second image frame) of the picture quality processing circuit is down-scaled, the picture quality processing circuit may perform picture quality processing more economically to generate the third image frame with low resolution. After completing the picture quality processing, the up-scaler circuit converts the third image frame into the fourth image frame (high resolution) by using the up-scaling operation. Because the up-scaling operation performed by the up-scaler circuit is symmetrical to the down-scaling operation performed by the down-scaler circuit, the image details of the up-scaled fourth image frame may be closer to the image details of the first image frame.

In order to make the aforementioned features and advantages of the disclosure comprehensible, embodiments accompanied with drawings are described in detail below.

DESCRIPTION OF THE EMBODIMENTS

Figure 1:
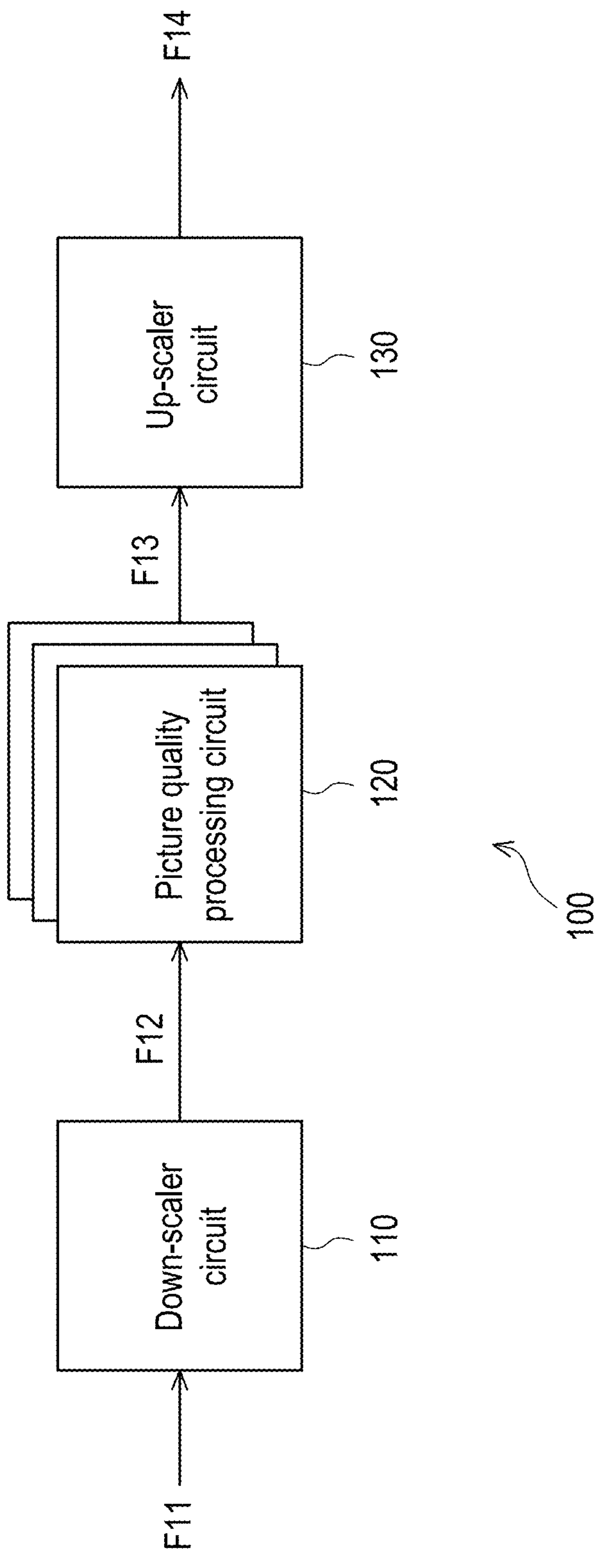
FIG. 1 is a schematic diagram of a circuit block of an image processing integrated circuit according to an embodiment of the disclosure.

The term "coupled to" used in the entire text of the specification of the present application (including claims) may refer to any direct or indirect connecting means. For example, if the text describes a first device is coupled to a second device, it should be understood that the first device may be directly connected to the second device, or the first device may be indirectly connected to the second device via other devices or certain connecting means. The terms "first", "second", and the like as mentioned throughout the present specification (including the claims) are used to name the elements or to distinguish between different embodiments or scopes, rather than setting an upper or lower limit on the number of the elements or the order of the elements. In addition, wherever possible, elements/components/steps with the same reference numerals in the drawings and embodiments represent the same or similar parts. Cross-reference may be made between the elements/components/steps in different embodiments that are denoted by the same reference numerals or that have the same names. These embodiments are only a part of the disclosure, and do not disclose all possible implementations of the disclosure.

FIG. 1 is a schematic diagram of a circuit block of an image processing integrated circuit according to an embodiment of the disclosure. A image processing integrated circuit 100 may perform picture quality (PQ) processing on an original image frame (such as an image frame F11) to generate a processed image frame (such as an image frame F14) to a display driving circuit (not shown in FIG. 1). The image processing integrated circuit 100 shown in FIG. 1 includes a down-scaler circuit 110, a picture quality processing circuit 120, and an up-scaler circuit 130. According to different designs, in some embodiments, the implementation of the down-scaler circuit 110, the picture quality processing circuit 120, and/or the up-scaler circuit 130 may be a hardware circuit. In other embodiments, the implementation of the down-scaler circuit 110, the picture quality processing circuit 120, and/or the up-scaler circuit 130 may be a combination of hardware and firmware or software (that is, a program).

In the combination of hardware, the aforementioned up-scaler circuit 110, the picture quality processing circuit 120, and/or the up-scaler circuit 130 may be implemented on a logic circuit of an integrated circuit. For example, the related functions of the down-scaler circuit 110, the picture quality processing circuit 120, and/or the up-scaler circuit 130 may be implemented in one or more hardware controllers, microcontrollers, hardware processors, microprocessors, application-specific integrated circuits (ASIC), digital signal processors (DSP), field programmable logic gate arrays (FPGA), central processing unit (CPU), and/or various logical blocks, modules, and circuits of other processing units. The related functions of the down-scaler circuit 110, the picture quality processing circuit 120, and/or the up-scaler circuit 130 may be implemented as a hardware circuit by using hardware description languages such as Verilog HDL or VHDL or other suitable programming languages such as the various logical blocks, the modules, and the circuits of the integrated circuit.

In the combination of hardware and software or firmware, the related functions of the aforementioned down-scaler circuit 110, the picture quality processing circuit 120, and/or the up-scaler circuit 130 may be implemented as programming codes. For example, the down-scaler circuit 110, the picture quality processing circuit 120, and/or the up-scaler circuit 130 are implemented by using general programming languages such as C, C++, or combination languages or other suitable programming languages. The programming code may be recorded/stored in a non-transitory machine-readable storage medium. In some embodiments, the non-transitory machine-readable storage medium includes, for example, a semiconductor memory and/or a storage device. The semiconductor memory includes a memory card, a read-only memory (ROM), a flash memory, a programmable logical circuit or other semiconductor memories. The storage device includes a hard disk drive (HDD), a solid-state drive (SSD), or other storage devices. An electronic device (such as a CPU, a hardware controller, a microcontroller, a hardware processor, or a microprocessor) may read and execute the programming code from the non-transitory machine-readable storage medium, thereby achieving the related functions of implementing the down-scaler circuit 110, the picture quality processing circuit 120, and/or the up-scaler circuit 130.

Figure 2:
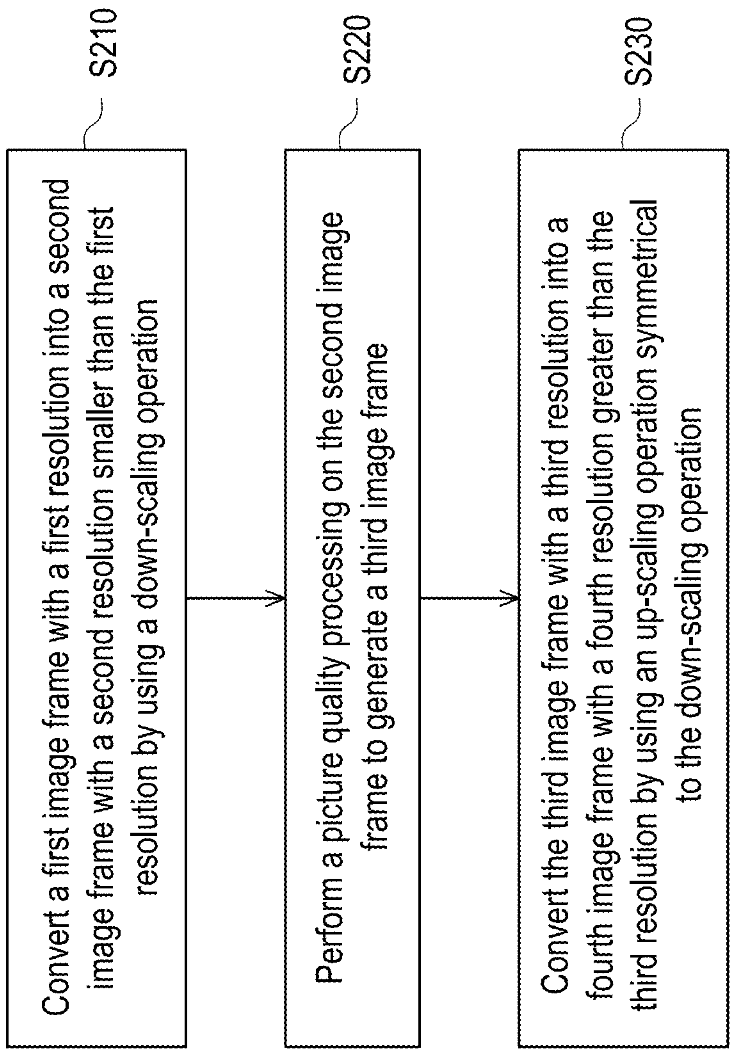
FIG. 2 is a schematic flowchart of an image processing method according to an embodiment of the disclosure.

FIG. 2 is a schematic flowchart of an image processing method according to an embodiment of the disclosure. Please refer to FIG. 1 and FIG. 2. In step S210, the down-scaler circuit 110 converts an image frame F11 (a first image frame) with a first resolution into an image frame F12 (a second image frame) with a second resolution smaller than the first resolution by using a down-scaling operation. The picture quality processing circuit 120 is coupled to the down-scaler circuit 110 to receive the image frame F12. In step S220, the picture quality processing circuit 120 performs one or multiple picture quality processing on the image frame F12 to generate an image frame F13 (a third image frame). Based on the actual design, the picture quality processing may include motion estimation and motion compensation (MEMC) or other picture quality processing. MEMC is a frame rate conversion technology. MEMC technology inserts extra frames between original frames to make the video look smoother. By converting the image frame F11 with the high resolution into the image frame F12 with the low resolution, the cost and power consumption of the picture quality processing circuit 120 may be effectively reduced.

The up-scaler circuit 130 is coupled to the picture quality processing circuit 120 to receive the image frame F13. After completing the picture quality processing, in step S230, the up-scaler circuit converts the image frame F13 with the third resolution into an image frame F14 with a fourth resolution greater than the third resolution by using an up-scaling operation. The up-scaling operation performed by the up-scaler circuit 130 is symmetrical to the down-scaling operation performed by the down-scaler circuit 110. The following descriptions are specific examples of the up-scaling operation performed by the up-scaler circuit 130 being symmetrical to the down-scaling operation performed by the down-scaler circuit 110 with different embodiments.

Figure 3:
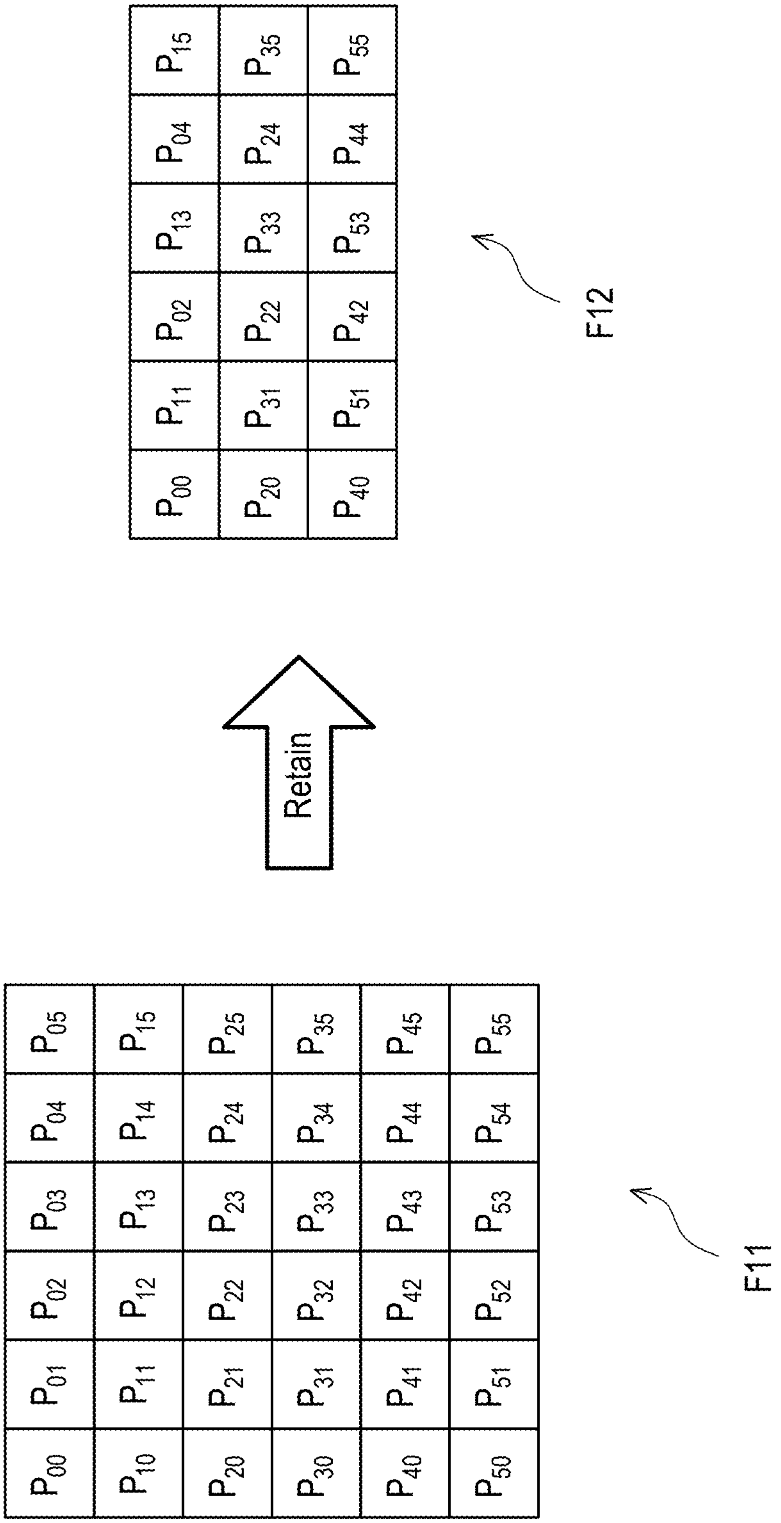
FIG. 3 is a schematic diagram of a down-scaling operation according to a first embodiment of the disclosure.

FIG. 3 is a schematic diagram of a down-scaling operation according to a first embodiment of the disclosure. The image frames F11 and F12 shown in FIG. 3 may be used as one of many implementation examples of the image frames F11 and F12 shown in FIG. 1. The first resolution of the image frame F11 shown in FIG. 1 may be determined according to the actual design. However, for convenience of illustration, according to the embodiment shown in FIG. 3, the resolution of the image frame F11 is assumed to be 6*6 pixels and only subpixel data of the same color are depicted. The down-scaling operation includes two actions: retaining and discarding. The down-scaling operation may retain multiple first subpixel data whose positions are corresponding to a first checkerboard pattern distributed in the image frame F11 and discard multiple second subpixel data whose positions are corresponding to a second checkerboard pattern staggered with the first checkerboard pattern distributed in the image frame F11, to generate the image frame F12 with the second resolution. For convenience of illustration, the resolution of the image frame F12 is assumed to be 6*3 pixels according to the embodiment shown in FIG. 3. For example, the subpixel data $P_{00}$, $P_{02}$, $P_{04}$, $P_{11}$, $P_{13}$, $P_{15}$, $P_{20}$, $P_{22}$, $P_{24}$, $P_{31}$, $P_{33}$, $P_{35}$, $P_{40}$, $P_{42}$, $P_{44}$, $P_{51}$, $P_{53}$, and $P_{55}$ (which are first subpixel data) whose positions are corresponding to the first checkerboard pattern distributed in the image frame F11 are retained. The subpixel data $P_{01}$, $P_{03}$, $P_{05}$, $P_{10}$, $P_{12}$, $P_{14}$, $P_{21}$, $P_{23}$, $P_{25}$, $P_{30}$, $P_{32}$, $P_{34}$, $P_{41}$, $P_{43}$, $P_{45}$, $P_{50}$, $P_{52}$, and $P_{54}$ (which are second subpixel data) whose positions are corresponding to a second checkerboard pattern staggered with the first checkerboard pattern distributed in the image frame F11 are discarded.

Figure 4:
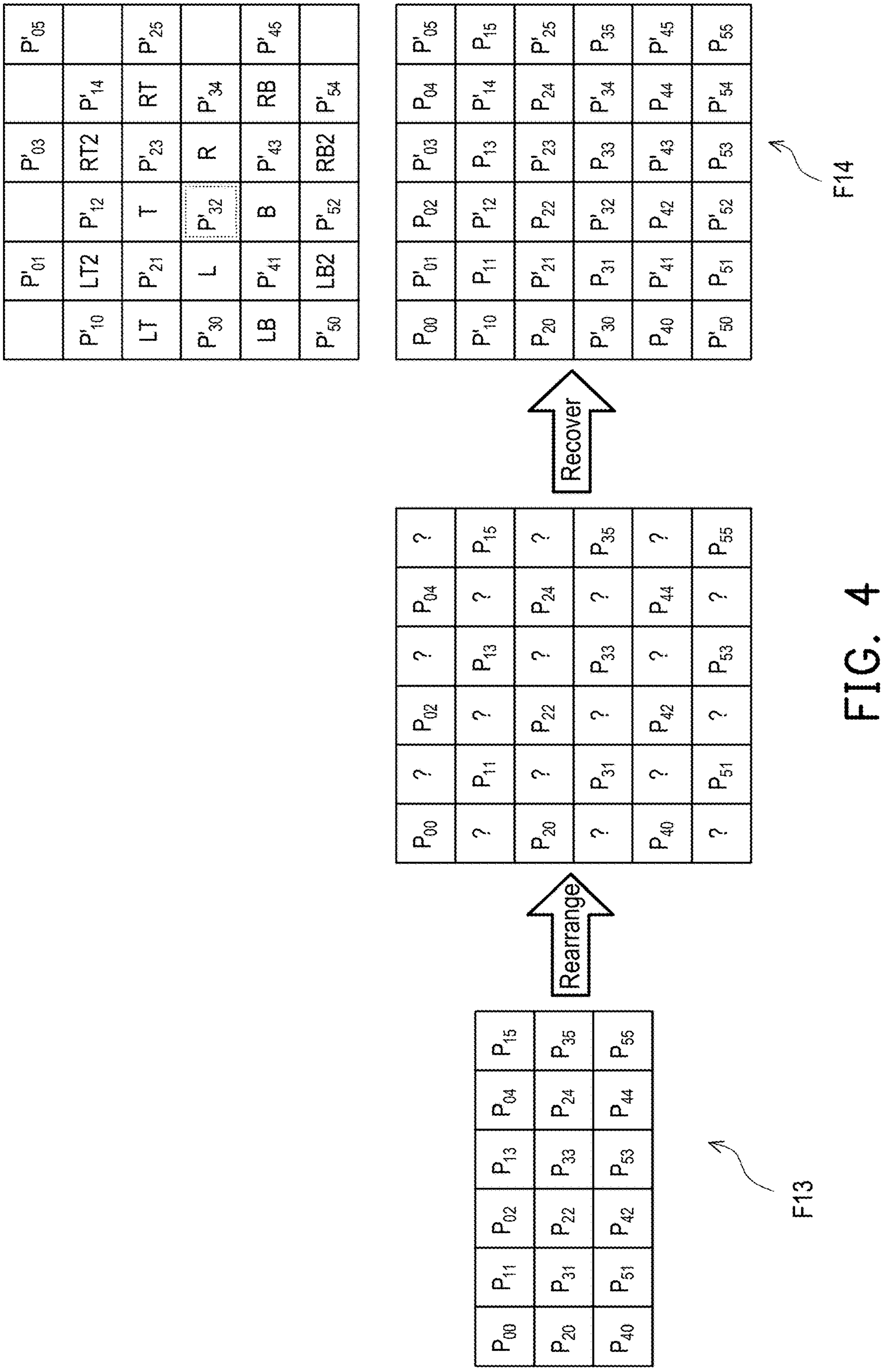
FIG. 4 is a schematic diagram of an up-scaling operation of an up-scaler circuit according to the first embodiment of the disclosure.

FIG. 4 is a schematic diagram of an up-scaling operation of an up-scaler circuit according to the first embodiment of the disclosure. The image frames F13 and F14 shown in FIG. 4 may be used as one of many implementation examples of the image frames F13 and F14 shown in FIG. 1. The resolutions of the image frames F13 and F14 shown in FIG. 1 may be determined by the actual design. However, for convenience of illustration, according to the embodiment shown in FIG. 4, the resolution of the image frame F13 is assumed to be 6*3 pixels, while the resolution of the image frame F14 is assumed to be 6*6 pixels and only subpixel data of the same color are depicted. The up-scaling operation includes two actions: rearranging and recovering. The up-scaling operation may rearrange multiple third subpixel data of the image frame F13 into positions corresponding to a third checkerboard pattern distributed in the image frame F14 with the fourth resolution. For example, the subpixel data $P_{00}$, $P_{11}$, $P_{02}$, $P_{13}$, $P_{04}$, $P_{15}$, $P_{20}$, $P_{31}$, $P_{22}$, $P_{33}$, $P_{24}$, $P_{35}$, $P_{40}$, $P_{51}$, $P_{42}$, $P_{53}$, $P_{44}$, and $P_{55}$ (which are third subpixel data) of the image frame F13 are rearranged to into positions corresponding to a third checkerboard pattern distributed in the image frame F14 (as shown in FIG. 4). Referring to FIG. 3 and FIG. 4, the rearranging action of the up-scaling operation is symmetrical to the retaining action of the down-scaling operation.

In addition, the up-scaling operation may recover multiple fourth subpixel data whose positions are corresponding to a fourth checkerboard pattern staggered with the third checkerboard pattern distributed in the image frame F14 based on the rearranged third subpixel data of the fourth image frame F14. For example, as shown in FIG. 4, the up-scaling operation may recover the subpixel data $P'_{01}$, $P'_{03}$, $P'_{05}$, $P'_{10}$, $P'_{12}$, $P'_{14}$, $P'_{21}$, $P'_{23}$, $P'_{25}$, $P'_{30}$, $P'_{32}$, $P'_{34}$, $P'_{41}$, $P'_{43}$, $P'_{45}$, $P'_{50}$, $P'_{52}$, and $P'_{54}$ (which are fourth subpixel data) whose positions are corresponding to the fourth checkerboard pattern staggered with the third checkerboard pattern distributed in the image frame F14. The following description is a specific example of the recovering action of the up-scaling operation.

The recovering action of the up-scaling operation includes: recovering one of the fourth subpixel data (called a recovered subpixel data) $P'_{01}$, $P'_{03}$, $P'_{05}$, $P'_{10}$, $P'_{12}$, $P'_{14}$, $P'_{21}$, $P'_{23}$, $P'_{25}$, $P'_{30}$, $P'_{32}$, $P'_{34}$, $P'_{41}$, $P'_{43}$, $P'_{45}$, $P'_{50}$, $P'_{52}$, and $P'_{54}$ according to a first part of the rearranged third subpixel data $P_{00}$, $P_{11}$, $P_{02}$, $P_{13}$, $P_{04}$, $P_{15}$, $P_{20}$, $P_{31}$, $P_{22}$, $P_{33}$, $P_{24}$, $P_{35}$, $P_{40}$, $P_{51}$, $P_{42}$, $P_{53}$, $P_{44}$, and $P_{55}$ of the image frame F14 whose positions are adjacent to a position of the recovered subpixel data $P'_{01}$, $P'_{03}$, $P'_{05}$, $P'_{10}$, $P'_{12}$, $P'_{14}$, $P'_{21}$, $P'_{23}$, $P'_{25}$, $P'_{30}$, $P'_{32}$, $P'_{34}$, $P'_{41}$, $P'_{43}$, $P'_{45}$, $P'_{50}$, $P'_{52}$, and $P'_{54}$ along a determined direction. For example, the subpixel data $P'_{32}$ to be recovered shown in FIG. 4 is used in the following description, and the remaining subpixel data to be recovered may be deduced by referring to the relevant description of the subpixel data $P'_{32}$, and therefore is not repeated herein.

The up-scaler circuit 130 calculates cost values corresponding to the recovered subpixel data $P'_{32}$. Each of the cost values of the recovered subpixel data $P'_{32}$ represents a similarity of the first part of the rearranged subpixel data whose positions are adjacent to the position of the recovered subpixel data $P'_{32}$ along one of multiple directions. The up-scaler circuit 130 determines a direction which leads to the lowest cost value among the cost values of the subpixel data $P'_{32}$ to be as the determined direction, from the directions. In some embodiments, the directions considered by the up-scaler circuit 130 include horizontal and vertical directions. For example, the up-scaler circuit 130 calculates a cost value H_cost corresponding to the horizontal direction and a cost value V_cost corresponding to the vertical direction by the following Equation 1 and Equation 2.

$$H\_cost = abs(LT-T)*w1 + abs(RT-T)*w2 + abs(L-R)*w3 + abs(LB-B)*w4 + abs(RB-B)*w5 \quad \text{Equation 1}$$

-continued $$V\_cost = abs(LT2-L)*w6 + abs(L-LB2)*w7 + abs(T-B)*w8 + abs(RT2-R)*w9 + abs(R-RB2)*w10 \quad \text{Equation 2}$$

In Equations 1 and 2, taking the subpixel data $P'_{32}$ shown in FIG. 4 as an example, LT is the nearest upper-left neighboring subpixel data $P_{20}$ of the subpixel data $P'_{32}$, T is the nearest upper neighboring subpixel data $P_{22}$ of the subpixel data $P'_{32}$, RT is the nearest upper-right neighboring subpixel data $P_{24}$ of the subpixel data $P'_{32}$, L is the nearest left neighboring subpixel data $P_{31}$ of the subpixel data $P'_{32}$, R is the nearest right neighboring subpixel data $P_{33}$ of the subpixel data $P'_{32}$, LB is the nearest lower-left neighboring subpixel data $P_{40}$ of the subpixel data $P'_{32}$, B is the nearest lower neighboring subpixel data $P_{42}$ of the subpixel data $P'_{32}$, RB is the nearest lower-right neighboring subpixel data $P_{44}$ of the subpixel data $P'_{32}$, LT2 is the second-nearest upper-left neighboring subpixel data $P_{11}$ of the subpixel data $P'_{32}$, LB2 is the second-nearest lower-left neighboring subpixel data $P_{51}$ of the subpixel data $P'_{32}$, RT2 is the second-nearest upper-right neighboring subpixel data $P_{13}$ of the subpixel data $P'_{32}$, and RB2 is the second-nearest lower-right neighboring subpixel data $P_{53}$ of the subpixel data $P'_{32}$. The remaining subpixel data to be recovered may be deduced by referring to the relevant description of the subpixel data $P'_{32}$. In Equations 1 and 2, abs( ) represents the absolute value function, and any one of w1, w2, w3, w4, w5, w6, w7, w8, w9, and w10 is an arbitrary real number weight value determined by the actual design. For example (but not limited thereto), w1~w10 are all 1.

When the cost value H_cost corresponding to the horizontal direction is less than the cost value V_cost corresponding to the vertical direction, the up-scaler circuit 130 determines the horizontal direction as the determined direction. When the determined direction is the horizontal direction, the up-scaler circuit 130 selects the subpixel data of the nearest left neighboring subpixel and the nearest right neighboring subpixel of the image frame F14 adjacent to the current subpixel data to be recovered to calculate the current subpixel data to be recovered. For example, when the cost value H_cost corresponding to the horizontal direction is less than the cost value V_cost corresponding to the vertical direction, the up-scaler circuit 130 calculates the current subpixel data P' to be recovered by the following Equation 3. In Equation 3, L is the nearest left neighboring subpixel data of the subpixel data, R is the nearest right neighboring subpixel data of the subpixel data P', and >> represents the right shift function. It is assumed that the current subpixel data P' to be recovered is $P'_{32}$ shown in FIG. 4, the up-scaler circuit 130 selects the nearest left neighboring subpixel data $P_{31}$ and the nearest right neighboring subpixel data $P_{33}$ of the image frame F14 to calculate the subpixel data $P'_{32}$ by the following Equation 3 when the determined direction is the horizontal direction.

$$P' = (L + R + 1) \gg 1 \quad \text{Equation 3}$$

When the cost value H_cost is greater than the cost value V_cost, the up-scaler circuit 130 determines the vertical direction as the determined direction. When the determined direction is the vertical direction, the up-scaler circuit 130 selects the nearest upper neighboring subpixel and the nearest lower neighboring subpixel of the image frame F14 adjacent to the current subpixel data to be recovered to calculate the current subpixel data to be recovered. For example, when the cost value H_cost corresponding to the horizontal direction is greater than the cost value V_cost corresponding to the vertical direction, the up-scaler circuit 130 calculates the current subpixel data P' to be recovered by the following Equation 4. In Equation 4, T is the nearest upper neighboring subpixel data of the subpixel data P', and B is the nearest lower neighboring subpixel data of the subpixel data P'. It is assumed that the current subpixel data P' to be recovered is $P'_{32}$ shown in FIG. 4, the up-scaler circuit 130 selects the nearest upper neighboring subpixel data $P_{22}$ and the nearest lower neighboring subpixel data $P_{42}$ of the image frame F14 to calculate the subpixel data $P'_{32}$ by the following Equation 4 when the determined direction is the vertical direction.

$$P' = (T + B + 1) \gg 1 \quad \text{Equation 4}$$

In other embodiments, the directions considered by the up-scaler circuit 130 include a plurality of slant directions, such as at least one upper-right to lower-left direction and at least an upper-left to lower-right direction. For example, the up-scaler circuit 130 calculates the cost values Slanted_TL_cost, Slanted_RB_cost, Slanted_TR_cost, and Slanted_LB_cost corresponding to different slant directions by the following Equation 5, Equation 6, Equation 7, and Equation 8. In Equations 5 to 8, abs( ), RT2, T, L, LB, RT, R, B, LB2, LT2, RB, LT, and RB2 may refer to the relevant descriptions of Equations 1 and 2. In Equations 5 to 8, any one of w1, w2, w3, w4, w5, w6, w7, w8, w9, w10, w11, and w12 is an arbitrary real number weight values determined by the actual design. For example (but not limited thereto), w1~w12 are all 1.

$$\text{Slanted\_TL\_cost} = \text{abs}(RT2 - T) * w1 + \text{abs}(T - L) * w2 + \text{abs}(L - LB) * w3 \quad \text{Equation 5}$$

$$\text{Slanted\_RB\_cost} = \text{abs}(RT - R) * w4 + \text{abs}(R - B) * w5 + \text{abs}(B - LB2) * w6 \quad \text{Equation 6}$$

$$\text{Slanted\_TR\_cost} = \text{abs}(LT2 - T) * w7 + \text{abs}(T - R) * w8 + \text{abs}(R - RB) * w9 \quad \text{Equation 7}$$

$$\text{Slanted\_LB\_cost} = \text{abs}(LT - L) * w10 + \text{abs}(L - B) * w11 + \text{abs}(B - RB2) * w12 \quad \text{Equation 8}$$

For example, when the cost value Slanted_TL_cost is the smallest, the up-scaler circuit 130 calculates the current subpixel data P' to be recovered by the following Equation 9. In Equation 9, L is the nearest left neighboring subpixel data of the subpixel data P', T is the nearest upper neighboring subpixel data of the subpixel data P', and >> represents the right shift function. It is assumed that the current subpixel data P' to be recovered is $P'_{32}$ as shown in FIG. 4, the up-scaler circuit 130 selects the nearest upper neighboring subpixel data $P_{22}$ and the nearest left neighboring subpixel data $P_{31}$ of the image frame F14 to calculate the subpixel data $P'_{32}$ by the following Equation 9 when the cost value Slanted_TL_cost is the smallest.

$$P' = (T + L + 1) \gg 1 \quad \text{Equation 9}$$

For example, when the cost value Slanted_RB_cost is the smallest, the up-scaler circuit 130 calculates the following Equation 10 to obtain the current subpixel data P' to be recovered. In Equation 10, R is the nearest right neighboring subpixel data of the subpixel data P', and B is the nearest lower neighboring subpixel data of the subpixel data P'. It is assumed that the current subpixel data P' to be recovered is $P'_{32}$ as shown in FIG. 4, the up-scaler circuit 130 selects the nearest right neighboring subpixel data $P_{33}$ and the nearest lower neighboring subpixel data $P_{42}$ of image frame F14 to calculate the subpixel data $P'_{32}$ by the following Equation 10 when the cost value Slanted_RB_cost is the smallest.

$$P' = (R + B + 1) \gg 1 \quad \text{Equation 10}$$

For example, when the cost value Slanted_TR_cost is the smallest, the up-scaler circuit 130 calculates the current subpixel data P' to be recovered by the following Equation 11. In Equation 11, T is the upper nearest neighboring subpixel data of the subpixel data P', and R is the nearest right neighboring subpixel data of the subpixel data P'. It is assumed that the current subpixel data P' to be recovered is $P'_{32}$ as shown in FIG. 4, the up-scaler circuit 130 selects the nearest upper neighboring subpixel data $P_{22}$ and the nearest right neighboring subpixel data $P_{33}$ of the image frame F14 to calculate the subpixel data $P'_{32}$ by the following Equation 11 when the cost value Slanted_TR_cost is the smallest.

$$P' = (T + R + 1) \gg 1 \quad \text{Equation 11}$$

For example, when the cost value Slanted_LB_cost is the smallest, the up-scaler circuit 130 calculates the current subpixel data P' to be recovered by the following Equation 12. In Equation 12, L is the nearest left neighboring subpixel data of the subpixel data P', and B is the nearest lower neighboring subpixel data of the subpixel data P'. It is assumed that the current subpixel data P' to be recovered is $P'_{32}$ as shown in FIG. 4, the up-scaler circuit 130 selects the nearest left neighboring subpixel data $P_{31}$ and the nearest lower neighboring subpixel data $P_{42}$ of the image frame F14 to calculate the subpixel data $P'_{32}$ by the Equation 12 when the cost value Slanted_LB_cost is the smallest.

$$P' = (L + B + 1) \gg 1 \quad \text{Equation 12}$$

Base on the above, the down-scaler circuit 110 performs checkerboard point selection on the original image frame F11, and the resolution of the obtained image frame F12 changes from 6*6 pixels to 6*3 pixels. The retained subpixel data of the image frame F12 has not undergone any calculation and may be consistent with the subpixel data of the original image frame F11. The up-scaler circuit 130 returns the subpixel data of the image frame F13 to the corresponding position of the image frame F14, and then uses the neighboring subpixel data to calculate the missing pixel values in the checkerboard of the image frame F14, so that the resolution of the image frame F14 is increased to 6*6 pixels. Therefore, the image processing integrated circuit 100 may retain the largest part of the subpixel data of the original image, making the up-scaling result closer to the original image and retaining better precision.

Figure 5:
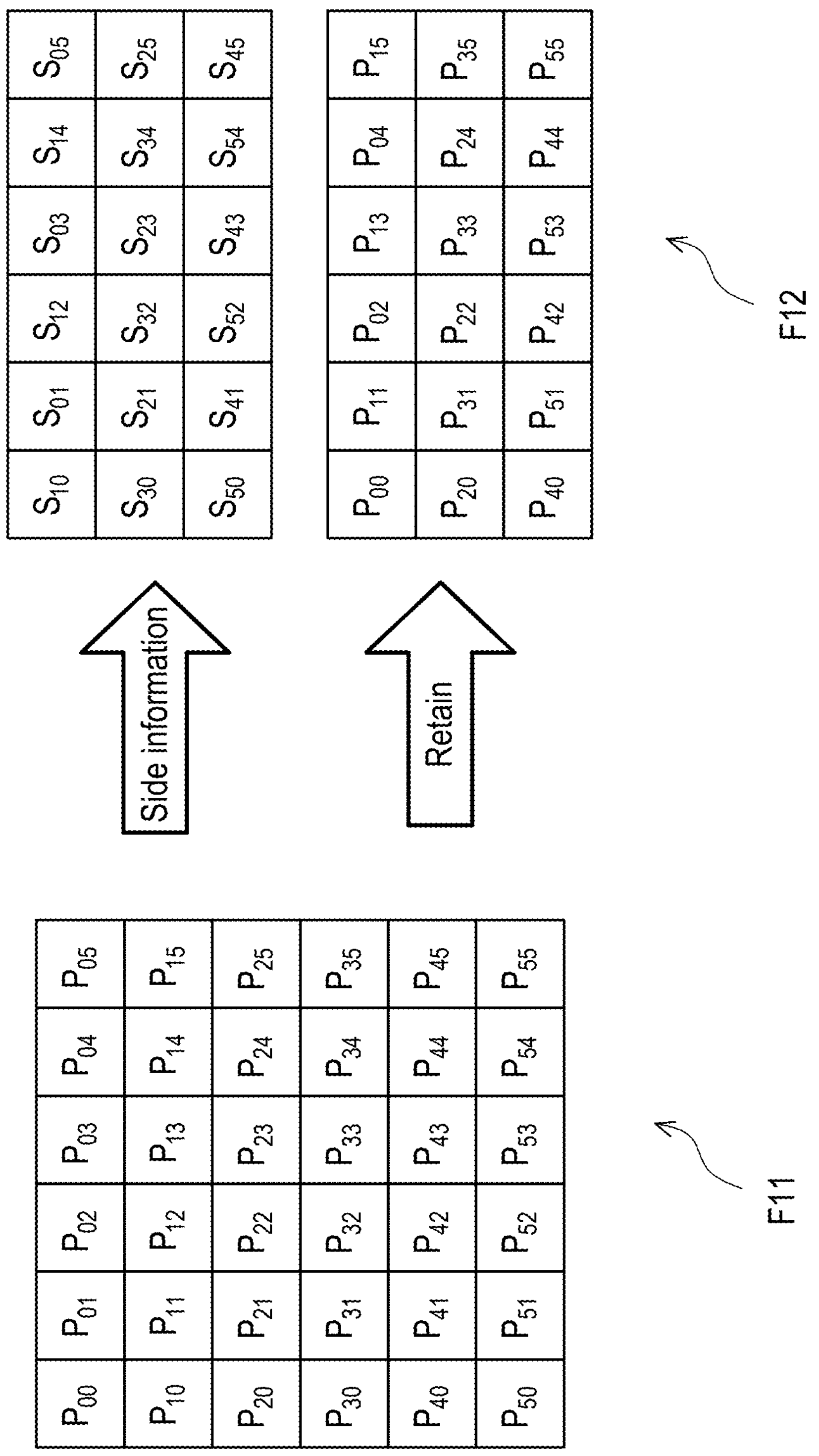
FIG. 5 is a schematic diagram of a down-scaling operation according to a second embodiment of the disclosure.

FIG. 5 is a schematic diagram of a down-scaling operation according to a second embodiment of the disclosure. The image frames F11 and F12 shown in FIG. 5 may be used as one of many implementation examples of the image frames F11 and F12 shown in FIG. 1. The first resolution of the image frame F11 shown in FIG. 1 may be determined by the actual design. However, for convenience, according to the embodiment shown in FIG. 5, the resolution of the image frame F11 is assumed to be 6*6 pixels. The down-scaling operation shown in FIG. 5 includes two actions: retaining and discarding, which may be deduced by referring to the relevant description of the down-scaling operation shown in FIG. 3, and therefore is not repeated herein.

According to the embodiment shown in FIG. 5, the down-scaling operation further includes an action of generating multiple side information. The down-scaler circuit 110 generates the side information $S_{01}$, $S_{03}$, $S_{05}$, $S_{10}$, $S_{12}$, $S_{14}$, $S_{21}$, $S_{23}$, $S_{25}$, $S_{30}$, $S_{32}$, $S_{34}$, $S_{41}$, $S_{43}$, $S_{45}$, $S_{50}$, $S_{52}$, and $S_{54}$ corresponding to the discarded second subpixel data $P_{01}$, $P_{03}$, $P_{05}$, $P_{10}$, $P_{12}$, $P_{14}$, $P_{21}$, $P_{23}$, $P_{25}$, $P_{30}$, $P_{32}$, $P_{34}$, $P_{41}$, $P_{43}$, $P_{45}$, $P_{50}$, $P_{52}$, and $P_{54}$ whose positions are in the second checkerboard pattern distributed in the image frame F 11.

According to the embodiment shown in FIG. 5, the action of generating the side information in the down-scaling operation includes calculating multiple cost values, comparing these cost values, and generating the discarded second subpixel data corresponding to the side information. Each of these cost values corresponds to a discarded subpixel data whose position is in the second checkerboard pattern distributed in the image frame F11, and represents a similarity of a part of the retained subpixel data whose positions are adjacent to the discarded subpixel data along one of the directions. The down-scaler circuit 110 compares these cost values to find out a determined direction from the directions, where the determined direction leading to the lowest cost value among the cost values. The down-scaler circuit 110 generates the side information corresponding to the discarded subpixel data, where the side information indicates the determined direction which leads to the lowest cost value. By deducing, the down-scaler circuit 110 generates the side information corresponding to the discarded subpixel data whose positions are in the second checkerboard pattern distributed in the image frame F11.

The down-scaler circuit 110 calculates multiple costs in different directions by using the retained subpixel data of the image frame F11 adjacent to the current discarded subpixel data. For example, the down-scaler circuit 110 calculates the following Equations 13 and 14 to obtain the cost value H_cost corresponding to the horizontal direction and the cost value V_cost corresponding to the vertical direction. Among them, abs( ) represents the absolute value function, CP is the current discarded subpixel data, L is the nearest left retained subpixel data of the image frame F11 adjacent to the current discarded subpixel data CP, R is the nearest right retained subpixel data of the image frame F11 adjacent to the current discarded subpixel data CP, T is the nearest upper retained subpixel data of the image frame F11 adjacent to the current discarded subpixel data CP, and B is the nearest lower retained subpixel data of the image frame F11 adjacent to the current discarded subpixel data CP.

$$\text{H\_cost} = \text{abs}(CP - (L + R)/2) \quad \text{Equation 13}$$

$$\text{V\_cost} = \text{abs}(CP - (T + B)/2) \quad \text{Equation 14}$$

For example, it is assumed that the current discarded subpixel data CP is $P_{21}$ shown in FIG. 5. Regarding to the discarded subpixel data $P_{21}$, the nearest upper retained subpixel data is $P_{11}$, the nearest left retained subpixel data is $P_{20}$, the nearest right retained subpixel data is $P_{22}$, and the nearest lower retained subpixel data is $P_{31}$. The remaining discarded subpixel data may be deduced by referring to the relevant description of the discarded subpixel data $P_{21}$.

The down-scaler circuit 110 compares these costs in different directions to determine the side information of the current discarded subpixel data. When the cost value H_cost is less than the cost value V_cost, the down-scaler circuit 110 determines the determined direction (the side information) of the current discarded subpixel data CP to be the horizontal direction. When the cost value H_cost is greater than the cost value V_cost, the down-scaler circuit 110 determines the determined direction (the side information) of the current discarded subpixel data CP to be the vertical direction. For example, it is assumed that the current discarded subpixel data CP is $P_{21}$ shown in FIG. 5. When cost value H_cost is less than cost value V_cost, the side information $S_{21}$ corresponding to the current discarded subpixel data $P_{21}$ is set that the determined direction is the horizontal direction (for example, the side information $S_{21}$ is set to a logic "0"). When cost value H_cost is greater than cost value V_cost, the side information $S_{21}$ corresponding to the current discarded subpixel data $P_{21}$ is set that the determined direction is the vertical direction (for example, the side information $S_{21}$ is set to a logic "1"). The remaining discarded subpixel data may be deduced by referring to the relevant description of the discarded subpixel data $P_{21}$.

Based on each of the discarded subpixel data $P_{01}$, $P_{03}$, $P_{05}$, $P_{10}$, $P_{12}$, $P_{14}$, $P_{21}$, $P_{23}$, $P_{25}$, $P_{30}$, $P_{32}$, $P_{34}$, $P_{41}$, $P_{43}$, $P_{45}$, $P_{50}$, $P_{52}$, and $P_{54}$ and the neighboring subpixel data relationship (similarity), the down-scaler circuit 110 may generate the side information $S_{01}$, $S_{03}$, $S_{05}$, $S_{10}$, $S_{12}$, $S_{14}$, $S_{21}$, $S_{23}$, $S_{25}$, $S_{30}$, $S_{32}$, $S_{34}$, $S_{41}$, $S_{43}$, $S_{45}$, $S_{50}$, $S_{52}$, and $S_{54}$ corresponding to the discarded subpixel data. The up-scaler circuit 130 performs the up-scaling operation by using the side information. Therefore, the up-scaling operation of the up-scaler circuit 130 is symmetrical to the down-scaling operation of the down-scaler circuit 110.

Figure 6:
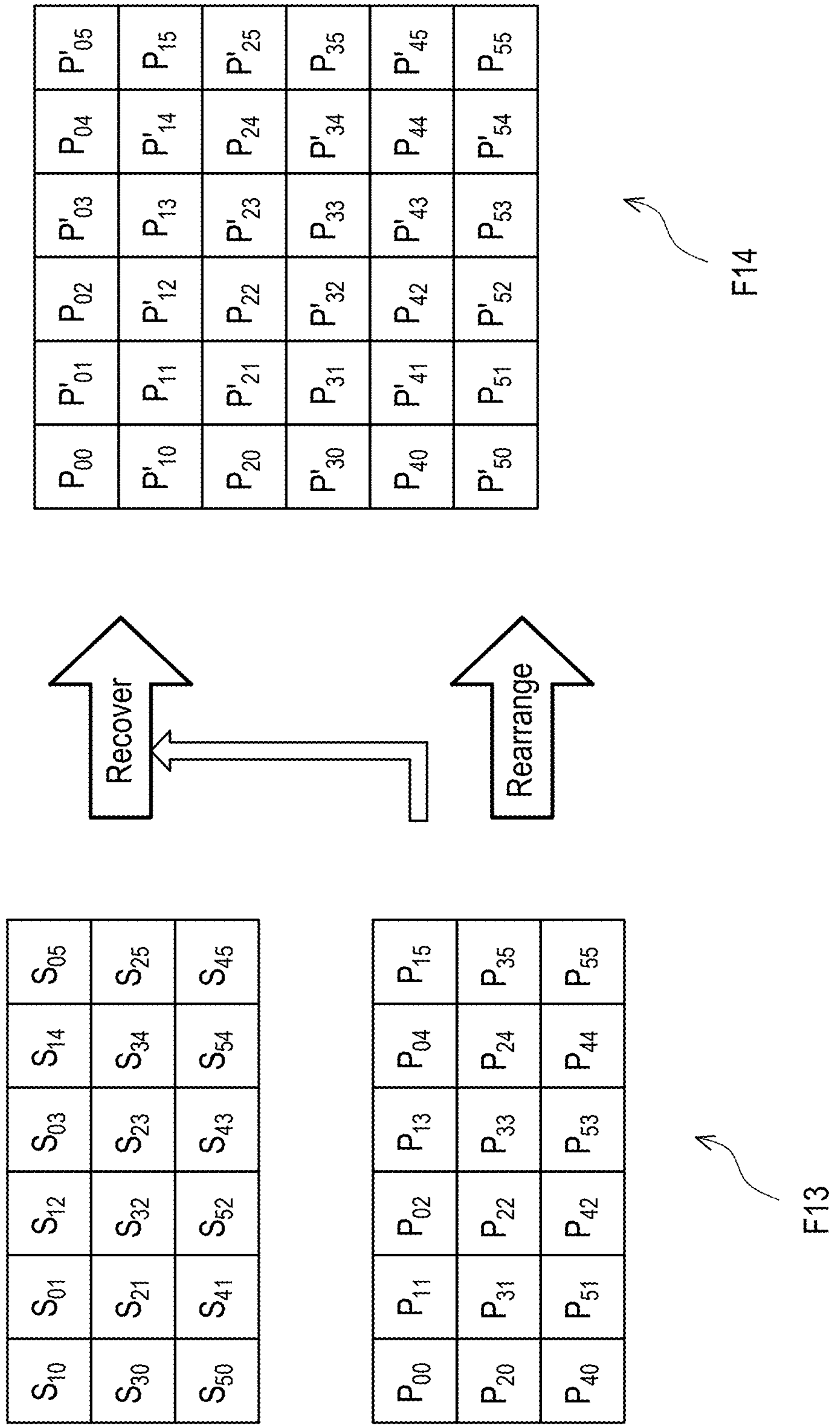
FIG. 6 is a schematic diagram of an up-scaling operation of an up-scaler circuit according to the second embodiment of the disclosure.

FIG. 6 is a schematic diagram of an up-scaling operation of an up-scaler circuit according to the second embodiment of the disclosure. The up-scaling operation includes two actions: rearranging and recovering. The up-scaler circuit 130 rearranges the subpixel data $P_{00}$, $P_{11}$, $P_{02}$, $P_{13}$, $P_{04}$, $P_{15}$, $P_{20}$, $P_{31}$, $P_{22}$, $P_{33}$, $P_{24}$, $P_{35}$, $P_{40}$, $P_{51}$, $P_{42}$, $P_{53}$, $P_{44}$, and $P_{55}$ of the image frame F13 into positions corresponding to the third checkerboard pattern distributed in the image frame F14 with the fourth resolution. Referring to FIG. 1, FIG. 5, and FIG. 6, the rearranging action of the up-scaling operation of the up-scaler circuit 130 is symmetrical to the retaining action of the down-scaling operation of the down-scaler circuit 110. In addition to the rearranged subpixel data (the third subpixel data) $P_{00}$, $P_{02}$, $P_{04}$, $P_{11}$, $P_{13}$, $P_{15}$, $P_{20}$, $P_{22}$, $P_{24}$, $P_{31}$, $P_{33}$, $P_{35}$, $P_{40}$, $P_{42}$, $P_{44}$, $P_{51}$, $P_{53}$, and $P_{55}$, the image frame F14 further includes the subpixel data to be recovered (the fourth subpixel data) $P'_{01}$, $P'_{03}$, $P'_{05}$, $P'_{10}$, $P'_{12}$, $P'_{14}$, $P'_{21}$, $P'_{23}$, $P'_{25}$, $P'_{30}$, $P'_{32}$, $P'_{34}$, $P'_{41}$, $P'_{43}$, $P'_{45}$, $P'_{50}$, $P'_{52}$, and $P'_{54}$, where the position of the subpixel data to be recovered whose positions are corresponding to the fourth checkerboard pattern staggered with the third checkerboard pattern distributed in the image frame F14.

The recovering action of the up-scaling operation includes: recovering one of the subpixel data P among $P'_{01}$, $P'_{03}$, $P'_{05}$, $P'_{10}$, $P'_{12}$, $P'_{14}$, $P'_{21}$, $P'_{23}$, $P'_{25}$, $P'_{30}$, $P'_{32}$, $P'_{34}$, $P'_{41}$, $P'_{43}$, $P'_{45}$, $P'_{50}$, $P'_{52}$, and $P'_{54}$ according to the first part of the rearranged subpixel data of the image frame whose positions are adjacent to the position of the recovered subpixel data along the reference direction indicated by the side information S corresponding to the recovered subpixel data, among $S_{01}$, $S_{03}$, $S_{05}$, $S_{10}$, $S_{12}$, $S_{14}$, $S_{21}$, $S_{23}$, $S_{25}$, $S_{30}$, $S_{32}$, $S_{34}$, $S_{41}$, $S_{43}$, $S_{45}$, $S_{50}$, $S_{52}$, and $S_{54}$. For example, taking the subpixel data $P'_{32}$ to be recovered shown in FIG. 6 as an example below, the description of the remaining subpixel data to be recovered may be deduced by referring to the relevant description of the subpixel data $P'_{32}$, and therefore is not repeated herein.

The subpixel data $P'_{32}$ to be recovered corresponds to the side information $S_{32}$. The up-scaler circuit 130 determines the recovering method of the subpixel data $P'_{32}$ based on the side information $S_{32}$. In some embodiments, the direction indicated by the side information $S_{32}$ includes the horizontal direction and the vertical direction. When the side information $S_{32}$ is set that the determined direction is the horizontal direction (for example, the side information $S_{32}$ is a logic "0"), the up-scaler circuit 130 selects the nearest left neighboring subpixel data $P_{31}$ and the nearest right neighboring subpixel data $P_{33}$ of the image frame F14 adjacent to the current subpixel data $P'_{32}$ to be recovered to calculate the current subpixel data $P'_{32}$ to be recovered. For example, when the side information $S_{32}$ represents the horizontal direction, the up-scaler circuit 130 calculates the current subpixel data P' to be recovered by the aforementioned Equation 3.

When the side information $S_{32}$ is set that the determined direction is the vertical direction (for example, the side information $S_{32}$ is a logic "1"), the up-scaler circuit 130 selects the nearest upper neighboring subpixel data $P_{22}$ and the nearest lower neighboring subpixel data $P_{42}$ of the image frame F14 adjacent to the current subpixel data $P'_{32}$ to be recovered to calculate the current subpixel data $P'_{32}$ to be recovered. For example, when the side information $S_{32}$ represents the vertical direction, the up-scaler circuit 130 calculates the current subpixel data P' to be recovered by the aforementioned Equation 4.

In the third embodiment, the down-scaler circuit 110 performs a pre-filtering operation on the image frame F11 before performing the down-scaling operation on the image frame F11. The description of the down-scaling operation of the third embodiment may be deduced by referring to the relevant description of the down-scaling operation of the first embodiment or the second embodiment, and therefore is not repeated herein. The pre-filtering operation of the third embodiment includes: adjusting the first subpixel data of the image frame F11 to be multiple weight-averaged subpixel data. Each of the weight-averaged subpixel data is generated based on a corresponding first subpixel data whose position is the same position as the weighted and averaged subpixel data, and multiple neighboring first subpixel data whose position surrounds the position of the corresponding first subpixel data multiplied by corresponding weight values.

Figure 7:
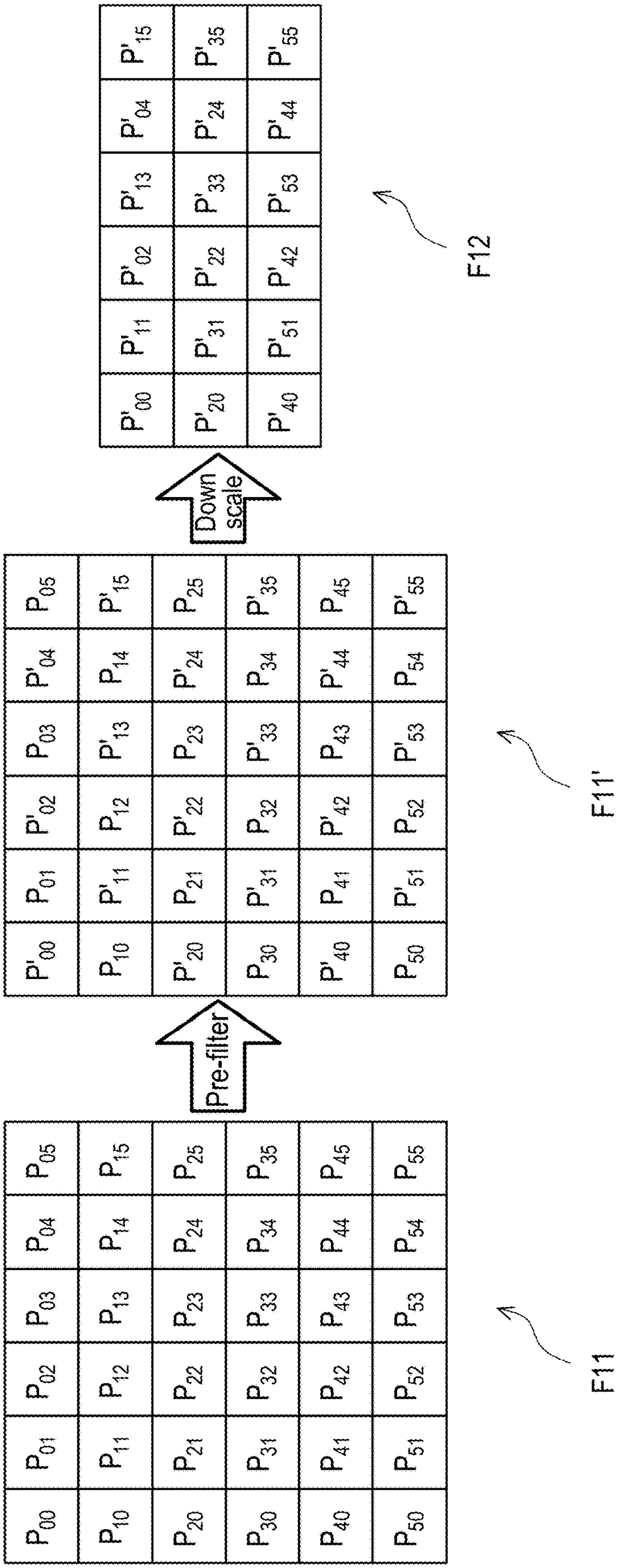
FIG. 7 is a schematic diagram of a pre-filtering operation according to a third embodiment of the disclosure.

For example, FIG. 7 is a schematic diagram of a pre-filtering operation according to a third embodiment of the disclosure. Referring to FIG. 1 and FIG. 7, the down-scaler circuit 110 performs the pre-filtering operation on the image frame F11 to generate a pre-filtered image frame F11'. Afterwards, the down-scaler circuit 110 performs the down-scaling operation on the pre-filtered image frame F11'. The description of the down-scaling operation described in this embodiment may refer to the relevant description of the down-scaling operation in the first embodiment or the second embodiment. The pre-filtering operation described in this embodiment may be any pre-filtering operation, such as well-known pre-filtering operations or other pre-filtering operations. For example, the up-scaler circuit 130 performs the pre-filtering operation by the Equation 15.

$$CP' = CP*w1 + T*w2 + L*w3 + R*w4 + B*w5 \qquad \text{Equation 15}$$

Here, taking the subpixel data $P_{22}$ shown in FIG. 7 as an example of the current subpixel data CP, the description of the remaining subpixel data to be pre-filtered may be deduced by referring to the relevant description of the subpixel data $P_{22}$. In Equation 15, the nearest upper neighboring subpixel data T is the subpixel data $P_{12}$, the nearest left neighboring subpixel data L is the subpixel data $P_{21}$, the nearest right neighboring subpixel data R is the subpixel data $P_{23}$, the nearest lower neighboring subpixel data B is subpixel data $P_{32}$, and w1, w2, w3, w4, and w5 may be arbitrary real numbers. For example (but not limited thereto), w1 may be 6/10, and w2, w3, w4, and w5 may be 1/10. Therefore, the pre-filtered subpixel data $P'_{22}$ of the pre-filtered image frame F11' is $P_{32}*(6/10)+P_{12}*(1/10)+P_{21}*(1/10)+P_{23}*(1/10)+P_{32}*(1/10)$.

Based on the above, the down-scaler circuit 110 converts the image frame F11 (first resolution) into the image frame F12 (second resolution smaller than the first resolution) by using the down-scaling operation. Afterwards, the picture quality processing circuit 120 performs one or multiple picture quality processing on the image frame F12 to generate the image frame F13. Because the resolution of the source of the image frame F12 of the picture quality processing circuit 120 is down-scaled, the picture quality processing circuit 120 may perform picture quality processing more economically to generate the image frame F13 with low resolution. After completing the picture quality processing, the up-scaler circuit 130 converts the image frame F13 into the image frame F14 (high resolution) by using the up-scaling operation. Because the up-scaling operation performed by the up-scaler circuit 130 is symmetrical to the down-scaling operation performed by the down-scaler circuit 110, the image details of the up-scaled image frame F14 may be closer to the image details of the original image frame F11 (that is, better reconstruction quality of an image may be achieved).

Although the present invention has been disclosed above through embodiments, they are not intended to limit the disclosure. Anyone with ordinary knowledge in the relevant technical field can make some changes and modifications without departing from the spirit and scope of the disclosure. Therefore, the protection scope of the disclosure shall be determined by the appended patent application scope.

What is claimed is:

1. An image processing integrated circuit comprising:

a down-scaler circuit converting a first image frame with a first resolution into a second image frame with a second resolution smaller than the first resolution by using a down-scaling operation;

a picture quality processing circuit coupled to the down-scaler circuit to receive the second image frame, wherein the picture quality processing circuit performs at least one picture quality processing on the second image frame to generate a third image frame; and an up-scaler circuit coupled to the picture quality processing circuit to receive the third image frame, wherein the up-scaler circuit converts the third image frame with the second resolution into a fourth image frame with a third resolution greater than the second resolution by using an up-scaling operation, and the up-scaling operation performed by the up-scaler circuit is symmetrical to the down-scaling operation performed by the down-scaler circuit, wherein the up-scaling operation comprises:

rearranging a plurality of third subpixel data of the third image frame into positions corresponding to a third checkerboard pattern distributed in the fourth image frame with the third resolution; and recovering a plurality of fourth subpixel data whose positions are corresponding to a fourth checkerboard pattern staggered with the third checkerboard pattern distributed in the fourth image frame based on the plurality of rearranged third subpixel data of the fourth image frame.

2. The image processing integrated circuit according to claim 1, wherein the at least one picture quality processing includes motion estimation and motion compensation.

3. The image processing integrated circuit according to claim 1, wherein the down-scaling operation comprises:

retaining a plurality of first subpixel data whose positions are corresponding to a first checkerboard pattern distributed in the first image frame to generate the second image frame with the second resolution; and discarding a plurality of second subpixel data whose positions are corresponding to a second checkerboard pattern staggered with the first checkerboard pattern distributed in the first image frame.

4. The image processing integrated circuit according to claim 1, wherein recovering the plurality of fourth subpixel data whose positions are corresponding to the fourth checkerboard pattern based on the plurality of rearranged third subpixel data of the fourth image frame comprises:

recovering one of the plurality of fourth subpixel data according to a first part of the plurality of rearranged third subpixel data of the fourth image frame whose positions are adjacent to a position of a plurality of recovered fourth subpixel data along a determined direction.

5. The image processing integrated circuit according to claim 4, wherein the up-scaling operation further comprises:

calculating a plurality of cost values corresponding to the plurality of recovered fourth subpixel data, wherein each of the plurality of cost values is determined based on the first part of the plurality of rearranged third subpixel data whose positions are adjacent to the position of the plurality of recovered fourth subpixel data along one of a plurality of directions; and determining a direction which leads to a lowest cost value among the plurality of cost values to be as the determined direction, from the plurality of directions.

6. The image processing integrated circuit according to claim 5, wherein the plurality of directions comprise a horizontal direction and a vertical direction.

7. The image processing integrated circuit according to claim 5, wherein the plurality of directions comprise a plurality of slant directions.

8. The image processing integrated circuit according to claim 3, wherein the down-scaler circuit generates a plurality of side information corresponding to the plurality of second subpixel data whose positions are corresponding to the second checkerboard pattern distributed in the first image frame, and the up-scaler circuit executes the up-scaling operation by using the plurality of side information.

9. The image processing integrated circuit according to claim 3, wherein the down-scaling operation further comprises:

calculating a plurality of cost values, wherein each of the plurality of cost values is corresponding to the plurality of discarded second subpixel data whose position is in the second checkerboard pattern distributed in the first image frame and is determined based on a part of the plurality of retained first subpixel data whose positions are adjacent to the discarded second subpixel data along one of a plurality of directions;

comparing the plurality of cost values to find out a determined direction from the plurality of directions, wherein the determined direction leading to a lowest cost value among the plurality of cost values;

generating a side information corresponding to the plurality of discarded second subpixel data, wherein the side information indicating the determined direction which leads to the lowest cost value; and generating a plurality of side information corresponding to the plurality of discarded second subpixel data whose positions are in the second checkerboard pattern distributed in the first image frame.

10. The image processing integrated circuit according to claim 9, wherein the fourth image frame has the plurality of rearranged third subpixel data and the plurality of fourth subpixel data whose positions are corresponding to the fourth checkerboard pattern staggered with the third checkerboard pattern distributed in the fourth image frame;

wherein the up-scaling operation further comprises:

recovering one of the plurality of fourth subpixel data according to a first part of the plurality of rearranged third subpixel data of the fourth image frame whose positions are adjacent to a position of the plurality of recovered fourth subpixel data along a reference direction indicated by the side information.

11. The image processing integrated circuit according to claim 10, wherein the reference direction is a horizontal direction or a vertical direction.

12. The image processing integrated circuit according to claim 1, wherein the down-scaler circuit performs a pre-filtering operation on the first image frame before performing the down-scaling operation on the first image frame.

13. The image processing integrated circuit according to claim 12, wherein the pre-filtering operation comprises:

adjusting a plurality of first subpixel data of the first image frame to be a plurality of weight-averaged subpixel data, wherein each of the plurality of weighted and averaged subpixel data is generated based on a corresponding first subpixel data whose position is the same position as the weighted and averaged subpixel data and a plurality of neighboring first subpixel data whose position surrounds the position of the corresponding first subpixel data multiplied by a corresponding weight value.

14. An image processing method, comprising:

converting, by a down-scaler circuit, a first image frame with a first resolution into a second image frame with a second resolution smaller than the first resolution by using a down-scaling operation;

performing, by a picture quality processing circuit, at least one picture quality processing on the second image frame to generate a third image frame; and converting, by an up-scaler circuit, the third image frame with the second resolution into a fourth image frame with a third resolution greater than the second resolution by using an up-scaling operation, wherein the up-scaling operation performed by the up-scaler circuit is symmetrical to the down-scaling operation performed by the down-scaler circuit, wherein the up-scaling operation comprises:

rearranging a plurality of third subpixel data of the third image frame into positions corresponding to a third checkerboard pattern distributed in the fourth image frame with the third resolution; and recovering a plurality of fourth subpixel data whose positions are corresponding to a fourth checkerboard pattern staggered with the third checkerboard pattern distributed in the fourth image frame based on the plurality of rearranged third subpixel data of the fourth image frame.

15. The image processing method according to claim 14, wherein the at least one picture quality processing includes motion estimation and motion compensation.

16. The image processing method according to claim 14, wherein the down-scaling operation comprises:

retaining a plurality of first subpixel data whose positions are corresponding to a first checkerboard pattern distributed in the first image frame to generate the second image frame with the second resolution; and discarding a plurality of second subpixel data whose positions are corresponding to a second checkerboard pattern staggered with the first checkerboard pattern distributed in the first image frame.

17. The image processing method according to claim 14, wherein recovering the plurality of fourth subpixel data whose positions are corresponding to the fourth checkerboard pattern based on the plurality of rearranged third subpixel data of the fourth image frame comprises:

recovering one of the plurality of fourth subpixel data according to a first part of the plurality of rearranged third subpixel data of the fourth image frame whose positions are adjacent to a position of the plurality of recovered fourth subpixel data along a determined direction.

18. The image processing method according to claim 17, wherein the up-scaling operation further comprises:

calculating a plurality of cost values corresponding to the plurality of recovered fourth subpixel data, wherein each of the plurality of cost values is determined based on the first part of the plurality of rearranged third subpixel data whose positions are adjacent to the position of the plurality of recovered fourth subpixel data along one of a plurality of directions; and determining a direction which leads to a lowest cost value among the plurality of cost values to be as the determined direction, from the plurality of directions.

19. The image processing method according to claim 18, wherein the plurality of directions comprise a horizontal direction and a vertical direction.

20. The image processing method according to claim 18, wherein the plurality of directions comprise a plurality of slant directions.

21. The image processing method according to claim 16, wherein the down-scaler circuit generates a plurality of side information corresponding to the plurality of second subpixel data whose positions are corresponding to the second checkerboard pattern distributed in the first image frame, and the up-scaler circuit executes the up-scaling operation by using the plurality of side information.

22. The image processing method according to claim 16, wherein the down-scaling operation further comprises:

calculating a plurality of cost values, wherein each of the plurality of cost values is corresponding to a discarded second subpixel data whose position is in the second checkerboard pattern distributed in the first image frame and is determined based on a part of the plurality of retained first subpixel data whose positions are adjacent to the discarded second subpixel data along one of a plurality of directions;

comparing the plurality of cost values to find out a determined direction from the plurality of directions, wherein the determined direction which leads to a lowest cost value among the plurality of cost values;

generating a side information corresponding to the discarded second subpixel data, wherein the side information indicating the determined direction which leads to the lowest cost value; and generating a plurality of side information corresponding to the plurality of discarded second subpixel data whose positions are in the second checkerboard pattern distributed in the first image frame.

23. The image processing method according to claim 22, wherein the fourth image frame has the plurality of rearranged third subpixel data and the plurality of fourth subpixel data whose positions are corresponding to the fourth checkerboard pattern staggered with the third checkerboard pattern distributed in the fourth image frame;

wherein the up-scaling operation further comprises:

recovering one of the plurality of fourth subpixel data according to a first part of the plurality of rearranged third subpixel data of the fourth image frame whose positions are adjacent to a position of the plurality of recovered fourth subpixel data along a reference direction indicated by the side information.

24. The image processing method according to claim 23, wherein the reference direction is a horizontal direction or a vertical direction.

25. The image processing method according to claim 14, further comprising:

performing a pre-filtering operation on the first image frame by the down-scaler circuit before performing the down-scaling operation on the first image frame.

26. The image processing method according to claim 25, wherein the pre-filtering operation comprises:

adjusting a plurality of first subpixel data of the first image frame to be a plurality of weight-averaged subpixel data, wherein each of the plurality of weighted and averaged subpixel data is generated based on a corresponding first subpixel data whose position is the same position as the weighted and averaged subpixel data and a plurality of neighboring first subpixel data whose position surrounds the position of the corresponding first subpixel data multiplied by a corresponding weight value.

* * * * *